United States Patent
Messina et al.

(10) Patent No.: US 7,818,172 B2
(45) Date of Patent: Oct. 19, 2010

(54) VOICE RECOGNITION METHOD AND SYSTEM BASED ON THE CONTEXUAL MODELING OF VOICE UNITS

(75) Inventors: Ronaldo Messina, Lannion (FR); Denis Jouvet, Lannion (FR)

(73) Assignee: France Telecom, Paris (FR)

( * ) Notice: Subject to any disclaimer, the term of this patent is extended or adjusted under 35 U.S.C. 154(b) by 755 days.

(21) Appl. No.: 11/587,136

(22) PCT Filed: Apr. 20, 2004

(86) PCT No.: PCT/FR2004/000972

§ 371 (c)(1),
(2), (4) Date: Jun. 25, 2007

(87) PCT Pub. No.: WO2005/112000

PCT Pub. Date: Nov. 24, 2005

(65) Prior Publication Data

US 2007/0271096 A1    Nov. 22, 2007

(51) Int. Cl.
*G10L 15/14*    (2006.01)
*G10L 15/00*    (2006.01)

(52) U.S. Cl. .............. 704/256.2; 704/236; 704/256.5; 704/256.6

(58) Field of Classification Search .............. None
See application file for complete search history.

(56) References Cited

U.S. PATENT DOCUMENTS

| | | | | |
|---|---|---|---|---|
| 5,677,988 A | | 10/1997 | Takami et al. | |
| 5,679,001 A | * | 10/1997 | Russell et al. | 434/185 |
| 5,737,490 A | * | 4/1998 | Austin et al. | 704/256 |
| 5,787,396 A | * | 7/1998 | Komori et al. | 704/256 |
| 5,794,197 A | * | 8/1998 | Alleva et al. | 704/255 |
| 5,806,030 A | | 9/1998 | Junqua | |
| 5,937,384 A | * | 8/1999 | Huang et al. | 704/256 |
| 7,219,055 B2 | * | 5/2007 | Lucke | 704/234 |
| 2006/0074664 A1 | * | 4/2006 | Lam et al. | 704/255 |

FOREIGN PATENT DOCUMENTS

EP    0 805 434 A2    11/1997

OTHER PUBLICATIONS

Hagen, A. et al. "Multi-stream processin gusing context-independent and context-dependent hybrid systems," IEEE Proceedings on Acoustics Speech and Signal Processing, vol. 2 pp. 277-280, 2003.*
Rabiner, Lawrence R., "A Tutorial on Hidden Markov Models and Selected Applications in Speech Recognition", Proceedings of the IEEE, vol. 77, No. 2, Feb. 1989.

* cited by examiner

*Primary Examiner*—Matthew J Sked
(74) *Attorney, Agent, or Firm*—McKenna Long & Aldridge LLP

(57) ABSTRACT

The method of recognizing speech in an acoustic signal comprises developing acoustic stochastic models of voice units in the form of a set of states of an acoustic signal and using the acoustic models for recognition by a comparison of the signal with predetermined acoustic models obtained via a prior learning process. While developing the acoustic models, the voice units are modeled by means of a first portion of the states independent of adjacent voice units and by means of a second portion of the states dependent on adjacent voice units. The second portion of states dependent on adjacent voice units shares common parameters with a plurality of units sharing same phonemes.

14 Claims, 3 Drawing Sheets

VOICE RECOGNITION METHOD AND SYSTEM BASED ON THE CONTEXTUAL MODELING OF VOICE UNITS

This application claims priority from PCT/FR2004/000972, filed Apr. 20, 2004, which is hereby incorporated by reference in its entirely.

BACKGROUND OF THE INVENTION

The invention deals with the recognition of speech in an audio signal, for example an audio signal spoken by a speaker.

More particularly, the invention relates to an automatic voice recognition method and system based on the use of acoustic models of voice signals, wherein speech is modeled in the form of one or more successions of voice units each corresponding to one or more phonemes.

A particularly interesting application of such method and system concerns the automatic recognition of speech for voice dictation or in the case of telephone-related interactive voice services.

Various types of modeling can be used in the context of speech recognition. In this respect, reference can be made to the article by Lawrence R. Rabiner entitled "A Tutorial on Hidden Markov Models and Selected Applications in Speech Recognition", Proceedings of the IEEE, volume 77, No. 2, February 1989. This article describes the use of hidden Markov models to model voice sequences. According to such a modeling, a voice unit, for example a phoneme or a word, is represented in the form of a sequence of states, each associated with a probability density modeling a spectral shape that has to be observed on this state and that results from an acoustic analysis. A possible variant of implementation of the Markov models consists in associating the probability densities with the inter-state transitions. This modeling is then used to recognize a spoken speech segment by comparison with the available models associated with known units by the voice recognition system and obtained by a prior learning process.

The modeling of a voice unit is, however, strongly linked to the context in which a voice unit is situated. In practice, a phoneme can be pronounced in different ways depending on the phonemes that surround it.

Thus, for example, the French language words "étroit" and "zéro" which can be represented phonetically as follows:

"ei t r w a";

and

"z ei r au", contain a phoneme "r", the sound of which differs because of the sound of the phonemes that surround it.

In order to take account of the influence of the context in which a phoneme is situated, the voice units are normally modeled in the form of triphones which take account of the context in which they are situated, that is, according to the preceding voice unit and the next voice unit. Thus, by considering the words "étroit" and "zéro", these words can be retranscribed by means of the following triphones:

étroit: &[ei]t ei[t]r t[r]w r[w]a w[a]& zéro: &[z]ei z[ei]r ei[r]au r[au]&

According to this representation, the "&" sign is used to mark the limits of a word. For example, the triphone ei[t]r denotes a unit modeling the phoneme "t" when the latter appears after the phoneme "ei" and before the phoneme "r".

Another approach taking account of the context of a phoneme can consist in using voice models with voice units that correspond to a set of phonemes, for example a syllable.

According to this approach, the words "étroit" and "zéro" can be represented, using a voice unit corresponding to a syllable, as follows:

étroit: ei t|r|w|a zéro: z|ei r|au

As can be seen, such approaches require the availability of a large number of models to recognize words or sentences.

The number of units, taking into account contextual influences, depends greatly on the length of the context concerned. If the context is limited to the unit that precedes it and the unit that follows it, the possible number of contextual units is then equal to the number of non-context units to the third power. In the case of the phonemes (36 in French), this gives $36^3$. In the case of the syllables, the result is N×N×N, with N being in the order of several thousands. In this case, the number of possible voice units increases prohibitively and then requires very great resources in terms of memory and computation capability to implement a reliable voice recognition method.

Furthermore, there is not enough learning data available to estimate correctly such a high number of parameters.

The object of the invention is to overcome the above-mentioned drawbacks and to provide a speech recognition method and system that makes it possible to limit considerably the number of parameters needed to model long voice units, namely, voice units corresponding to a syllable or to a series of phonemes.

SUMMARY OF THE INVENTION

The invention thus proposes a method of recognizing speech in an acoustic signal, comprising steps for developing acoustic stochastic models of voice units in the form of a set of states of the acoustic signal and using the acoustic models to recognize the voice signal by comparing this signal with predetermined acoustic models obtained via a prior learning process.

According to a general feature of this method, while the acoustic models are being developed, one or more voice units are modeled by means of a first portion of the states independent of adjacent voice units and by means of a second portion of the states dependent on adjacent voice units, the second portion of states dependent on adjacent voice units sharing common parameters with a plurality of units sharing the same phonemes.

According to another feature of this method, the first portion of states independent of adjacent units, corresponds to median states of the voice unit and the second portion of states dependent on adjacent voice units corresponds to start and end states of the voice unit.

The portions independent of adjacent voice units can be specific to a single model.

In an embodiment, the states are each associated with an observation probability density. It is also possible to allow for observation probability densities to be associated with inter-state transitions. The common parameters are then the probability densities.

It is also possible to provide for the second portion of states dependent on adjacent voice units to further comprise at least one transition state which is used to connect states independent of adjacent voice units and has no probability density.

Furthermore, it is possible to provide for the states independent of adjacent voice units to be associated with transitions designed to cause consecutive state skips.

For example, the acoustic models are hidden Markov models.

The invention also proposes a voice recognition system, comprising means of analyzing voice signals for developing a sequence of observation vectors, means for developing an acoustic model of each signal in the form of a set of states of the signal, and means of comparing the acoustic signal with predetermined acoustic models obtained by a prior learning process and stored in a database.

The acoustic models of one or more voice units include a first portion of states independent of adjacent voice units and a second portion of states dependent on adjacent voice units, the second portion of states dependent on adjacent voice units sharing common parameters with a plurality of units sharing the same phonemes.

BRIEF DESCRIPTION OF THE DRAWINGS

Other objects, features and advantages of the invention will become apparent from reading the description that follows, given purely as a non-limiting example, and made with reference to the appended drawings in which.

DESCRIPTION OF PREFERRED EMBODIMENTS

Figure 1:
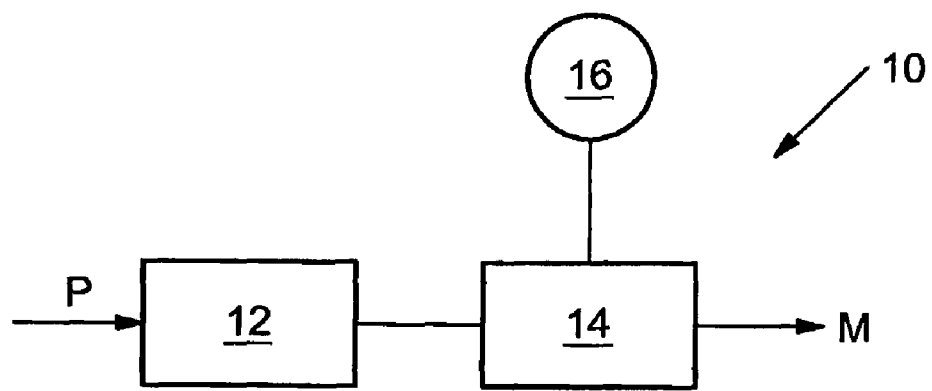
FIG. 1 is a block diagram illustrating the general structure of a voice recognition system according to the invention.

In FIG. 1, the general structure of a speech recognition system according to the invention, denoted by the general numeric reference 10, is represented very diagrammatically.

This system 10 is intended to analyze a voice signal P so as to develop a series of observation vectors, which are then processed to recognize words M, the models of which are known, contained in the signal P. The models are constructed from series of observation vectors so as to characterize the voice units, namely words, phonemes or series of phonemes, with which they are associated.

In the rest of the description, it will be assumed that the modeling consists in developing hidden Markov models. It will, however, be noted that the invention also applies to any other type of modeling appropriate for the envisaged use.

The development of hidden Markov models is a known technique within the scope of those skilled in the art, so it will not be described in detail below. For this, reference can be made to the abovementioned document "A Tutorial on Hidden Markov Models and Selected Applications in Speech Recognition" by Lawrence R. Rabiner, Proceedings of the IEEE, volume 77, No. 2, February 1989, incorporated for reference, which describes this technique in detail.

It will, however, be noted that the hidden Markov models constitute stochastic models developed so as to describe processes that evolve over time, and that can be in a finite set of states, not directly observable, each sending state being associated with a probability density which models the spectral shapes that are observed on the signal and that result from the acoustic analysis of the signal. In embodiment variants, these observation probability densities can be associated with inter-state transitions. However, in the context of the present description, the term "state" is understood to mean both a state proper and the probability density associated with it, the task of transposing the teaching of the present patent application to an embodiment in which the probability densities are associated with inter-state transitions being well within the scope of those skilled in the art.

As can be seen in FIG. 1, the speech recognition system comprises a first module 12 used to analyze the voice signal P so as to develop a series of observation vectors.

It spectrally or temporally analyzes the signal P, for example, by means of a rolling window, then develops the observation vectors by extracting relevant coefficients. For example, such coefficients are the cepstrum coefficients, also called MFCC coefficients ("Mel-Frequency Cepstrum Coefficients").

In the model construction phase, the duly developed vectors are used to build a model for each unit (word, phoneme or series of phonemes).

As is known per se, an HMM model is characterized by a set of parameters, namely the number of states of the model, the inter-state transition probabilities, and the observation vector sending probability densities.

After modeling a word, a second module 14 analyzes the correspondence with a set of models obtained by a prior learning process and extracted from a database 16 so as to identify the candidate word or words.

As indicated previously, this correspondence analysis is performed on the basis of acoustic units, each modeled by an HMM model.

Figure 2:
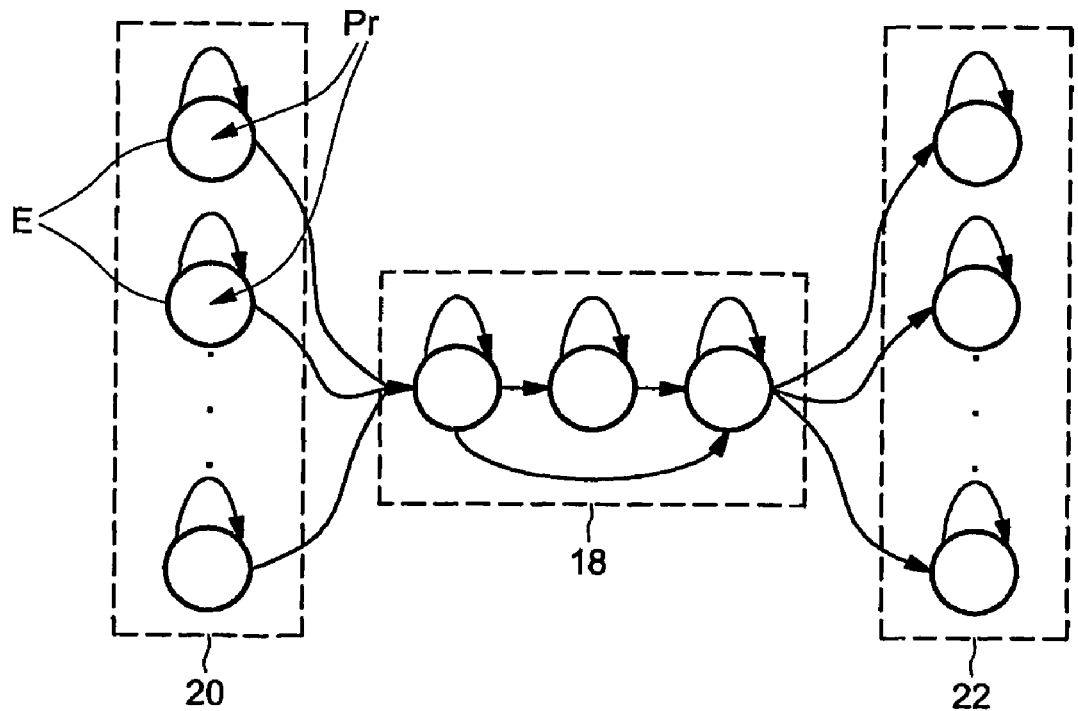
FIG. 2 is a diagram illustrating exemplary modeling of a voice signal.

FIG. 2 represents a possible topology of a phoneme model.

According to a feature of the invention, this phoneme model is designed to take account of the context in which the phoneme is situated, that is, the preceding and next phoneme or phonemes or classes of phonemes. As can be seen in this FIG. 2, and as indicated previously, this modeling is based on the development of a set of descriptive states such as E, each associated with an observation probability density Pr. To proceed with this modeling, a set of internal states 18 is defined, the states being independent of the context of the phoneme or phonemes concerned and of the external states 20 and 22 dependent on an adjacent voice unit. It will, however, be noted that the internal states 18 can also be made dependent on the context in order to increase the accuracy of the model.

The models of the words or expressions to be recognized are obtained by concatenating models of the units (phonemes or series of phonemes) and in connecting them according to the context, by selecting relevant states (E). Thus, the parameters of the external states 20 and 22 take account of the contextual influence of each phoneme. Regarding the internal states 18, the first and last states have a dependence with respect to the lesser context because of the fact that their parameters are estimated by using data from all the versions dependent on the context of each phoneme.

Figure 3:
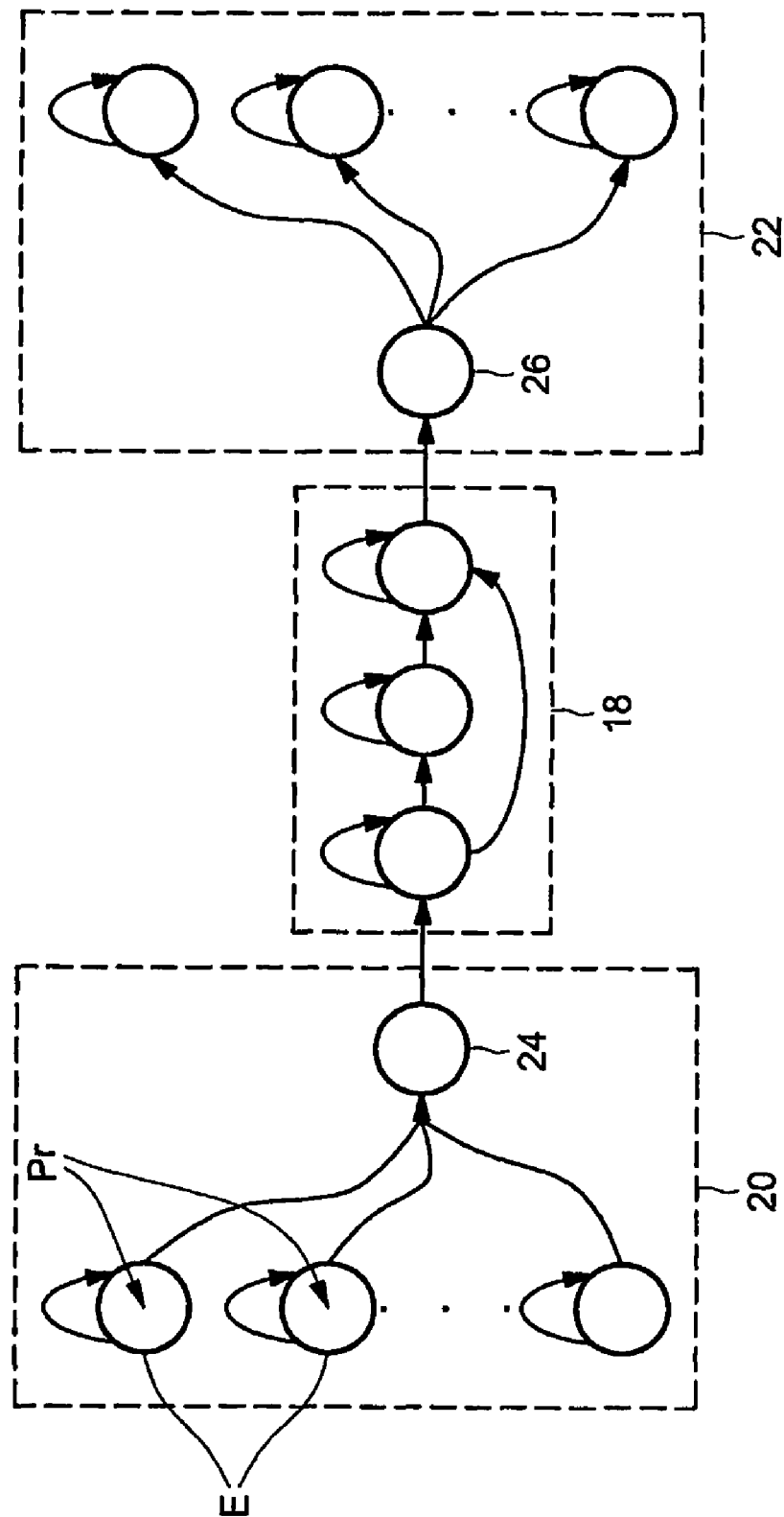
FIG. 3 illustrates a variant of modeling a voice signal.

As is represented in FIG. 3, in which elements identical to those of FIG. 2 are represented by the same numerical references, it is also possible to add, between the external states 20 and 22, on the one hand, and the internal states 18, inert or non-sending states 24 and 26 used mainly to connect the external states 20 and 22 to the internal states 18, in particular when modeling long voice units, but also when modeling phonemes.

Figure 4:
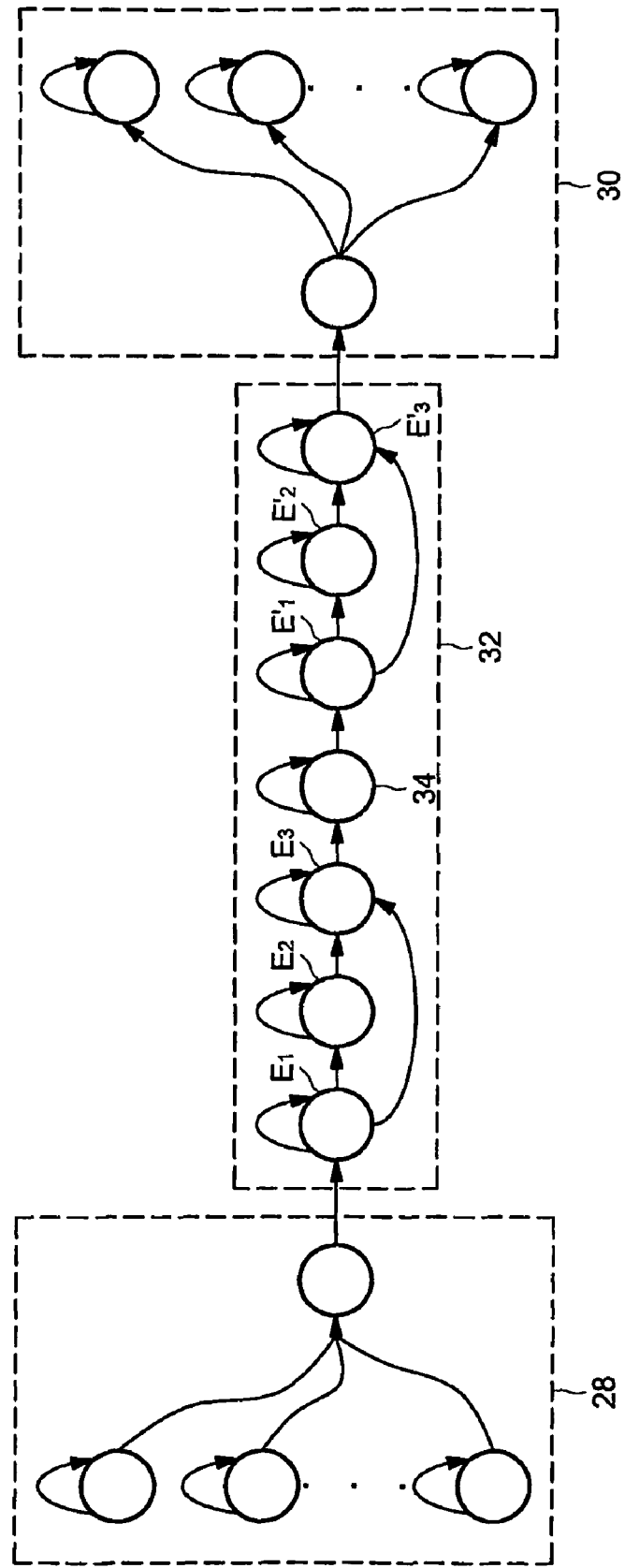
FIG. 4 illustrates another variant of modeling a voice signal.

FIG. 4 shows another modeling used to model long voice units. In this figure, the external states 28 and 30 correspond to the external states 20 and 22 in FIG. 3. The central states 32 include, in this example, three states for each phoneme, E1, E2, E3 and E'1, E'2 and E'3, for the phonemes "k" and "e" respectively, separated by a connecting state 34, each of these states being associated with an observation probability density. It will be noted that the connecting state 34 could be shared by all the voice units in which a "k" is associated with an "e".

The modeling illustrated in FIG. 4 can be used to model the voice unit "k|e". In principle, this voice unit is divided into three parts, namely a left part, a central part and a right part, respectively denoted:

"k_l" "k|e_c" and "e_r"

which respectively correspond to the states 28, 32 and 30. It will be noted that other breakdowns can also be envisaged.

The states 28 and 30 constitute as many inputs and outputs as there are left and right contexts, respectively, for the voice unit concerned. In other words, the number of states 20 and 22 is determined according to left and right contexts, respectively for the phonemes k and e. It will be noted that the relevant contextual states are selected when concatenating the models of the voice units to build the models of the words or the expressions.

In the different embodiments considered, all the voice units that have one and the same first phoneme share a same left model 20, 28, dependent on the context or indeed share only some common parameters, in particular observation densities. Thus, for example, the long voice unit "k|e" and the phoneme "k" share the same model "k_l", as for any other voice unit that begins with a "k". Such is also the case concerning the last phoneme. All the voice units that have the same last phoneme share the same right model dependent on the context, in this case "e_r". The parameters of these contextual models are thus shared between a large number of units, and therefore estimated based on a large number of data items only the central part 18, 32 is specific only to one voice unit. It is, however, possible to make this central part 18, 32 dependent on the context, to a certain extent, by providing specific state transition paths within its central states tending to skip one or more states and this according to the context.

As can be seen, with the invention according to which contextual parameters are shared between long acoustic units (phonemes, syllables or any series of phonemes), the number of parameters necessary for speech recognition with long acoustic units is considerably reduced.

The invention claimed is:

1. A method of recognizing speech in an acoustic signal, comprising the steps of:
    modeling at least one voice unit of an acoustic signal, such that at least one voice unit is represented in the form of a stochastic acoustic model comprising a plurality of states with a first portion of states and a second portion of states; and
    recognizing a voice signal by comparing said voice signal with said stochastic acoustic model obtained via a prior learning process, wherein the step of modeling the at least one voice unit comprises modeling the first portion of states, which corresponds to median states of the voice unit and comprises states which depend on the whole of the voice unit, and modeling the second portion of the states, which corresponds to start and end states of the voice unit and depends on adjacent voice units that share common parameters with a plurality of voice units sharing the same phonemes.

2. The method as claimed in claim 1, wherein the first portion of states is specific to a single model.

3. The method as claimed in claim 1, wherein the states are each associated with a respective observation probability density.

4. The method as claimed in claim 3, wherein said common parameters comprise the probability densities.

5. The method as claimed in claim 3, wherein the second portion of states further comprises at least one transition state used to connect states independent of adjacent voice units and having no probability density.

6. The method as claimed in claim 3, wherein the states associated with the first portion of states are independent of adjacent voice units and associated with transitions designed to cause consecutive state skips.

7. The method as claimed in claim 1, wherein the stochastic acoustic model comprises inter-state transitions which are associated with probability densities.

8. The method as claimed in claim 7, wherein said common parameters comprise the probability densities.

9. The method as claimed in claim 7, wherein the states associated with the second portion of states are dependent on adjacent voice units, and wherein the second portion of states further comprises at least one transition state used to connect states independent of adjacent voice units and having no probability density.

10. The method as claimed in claim 7, wherein the states associated with the first portion of states are independent of adjacent voice units and associated with transitions designed to cause consecutive state skips.

11. The method as claimed in claim 1 wherein, the acoustic models comprise hidden Markov models.

12. The method as claimed in claim 1, wherein the first portion of states are partially determined according to the adjacent voice units.

13. The method as claimed in claim 1, wherein the first portion of states are independent of adjacent voice units and the second portion of states are dependent on adjacent voice units.

14. A voice recognition system, comprising:
    means for analyzing a voice signals, having a plurality of voice units, and for developing a sequence of observation vectors;
    means for developing a stochastic acoustic model for each voice signal in the form of a plurality of states; and
    means for comparing each of the stochastic acoustic models with a predetermined acoustic model obtained by a prior learning process and stored in a database, wherein at least one stochastic acoustic model includes a first portion of states corresponding to median states of a voice unit and comprising states that depend on the whole of the voice unit, and a second portion of states corresponding to start and end states of the voice unit and comprising states dependent on adjacent voice units that share common parameters with a plurality of voice units sharing the same phonemes.

* * * * *